T. T. PEDDY.
COMBINED VENTILATOR AND DEFLECTOR.
APPLICATION FILED JAN. 14, 1910.
973,966.
Patented Oct. 25, 1910.
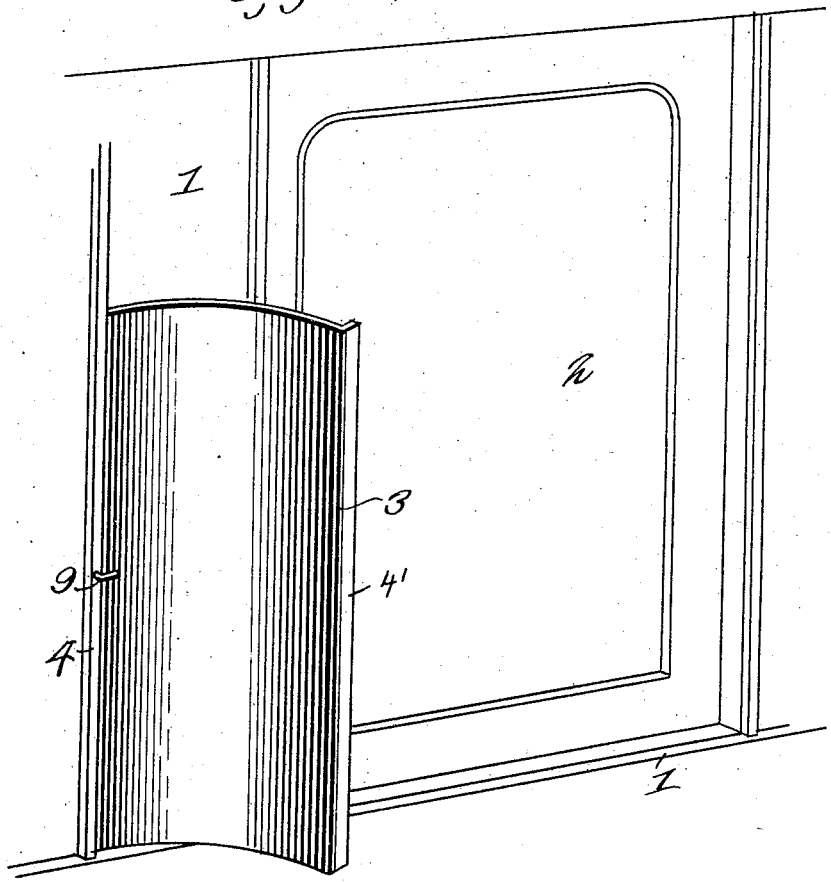
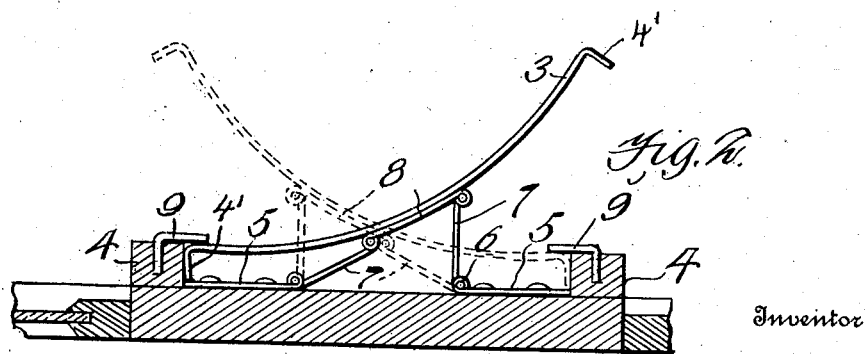
Witnesses
Inventor
Thomas T. Peddy
By Victor J. Evans
Attorney

UNITED STATES PATENT OFFICE.

THOMAS T. PEDDY, OF BIENVILLE, LOUISIANA, ASSIGNOR OF FIFTEEN ONE-HUNDREDTHS TO JESSIE L. BAKER, OF MOUNT LEBANON, LOUISIANA, AND THIRTY ONE-HUNDREDTHS TO GEORGE F. GALLAGHER, OF ROCHESTER, NEW YORK.

COMBINED VENTILATOR AND DEFLECTOR.

973,966.   Specification of Letters Patent.   Patented Oct. 25, 1910.

Application filed January 14, 1910.   Serial No. 538,128.

*To all whom it may concern:*

Be it known that I, THOMAS T. PEDDY, a citizen of the United States of America, residing at Bienville, in the parish of Bienville and State of Louisiana, have invented new and useful Improvements in Combined Ventilators and Deflectors, of which the following is a specification.

My invention relates to certain new and useful improvements in combined deflectors and ventilators, and it consists in the novel combination and arrangement of parts as will hereinafter be more particularly described and pointed out in the claims.

In the drawings: Figure 1 is a perspective view of my complete invention as attached to the side of a car adjacent to the window thereof. Fig. 2 is a cross section of my complete invention showing the means for adjusting the deflector in either direction according to the movement of the car.

The object of my invention is to provide a very simple and effective deflector and ventilator and is to be used particularly in connection with railway cars for preventing the cinders or dirt from entering the interior of the car and further providing the proper ventilation of the car, said combined deflector and ventilator being so constructed that the same may be secured to the car or form a permanent part of the same, or the device thus may be used or properly formed in such a manner as to be detachably secured to the car and practically held in a rigid position by the weight of the window; the form and construction of my invention being the same in either instance.

My invention therefore consists of a concaved deflector projecting from the side of the car adjacent to the window thereof, and means for holding and adjusting said deflector in its proper position in relation to the window, without obstructing the view of the passenger sitting in the seat opposite the window provided with said deflector.

My invention further consists in providing means for turning or changing the position of the deflector according to the direction of the moving car, and holding the same in said adjusted position, all of which will appear from the detailed description to follow.

Referring to the drawings 1 represents the side of a car having the usual window 2, the concaved deflector 3 being secured to the side of the car and located in its proper position in respect to the window thereof as will be hereinafter described. Between the oppositely located vertical strips 4 projecting from the outside wall of the car 1 is attached and located a concaved deflector 3 which as clearly shown in Fig. 2 is susceptible of being reversed and held in position by a pivotal or hinged connection as clearly shown in said figure. Fixed to the side of the car and adjacent to the vertical inner edges of the strips 4 are plates 5 having hinged ends 6 to which are movably attached one end of the connecting links 7, the opposite ends of said links being likewise hinged or movably attached to the opposite ends of a plate 8 which forms a part of or is attached to a concaved deflector 3 about its medial portion. The opposite ends of the concaved deflector 3 are bent inwardly to a distance approximating the thickness of the vertical strips 4 forming a flange 4', the edges of which are adapted to come in contact with the plates 5 when the deflector is turned in either position. Movably secured to each of the vertical strips 4 are turn buttons 9 or other suitable fastening devices which are adapted to be brought in frictional contact with the ends of the deflector 3 for holding the latter in either position.

It will be seen from the foregoing description that the connecting links 7 compensate or allow for the movement of the concaved deflector 3 in either direction and when the same is properly adjusted it is rigidly held in position and cannot possibly become displaced under the rough usage to which the same may be necessarily subjected. In particular it will be observed that one of the flanges 4' at the edges of the shield or deflector will, when the device is in position for operation, be sprung in behind one of the cleats or bars 4 and will thus, together with the turn button or holding member 9 contribute materially to supporting the shield or deflector in proper position for operation.

It is obvious that when a car equipped with the deflector is moving in a forward direction, the concave face of the deflector will be subject to a heavy pressure of air which varies with the velocity of the train, thus making it important that the device shall be firmly secured and braced as it will be by means of the links 7 in connection with the cleat 4 which engages the flange 4' at the front edge of the deflector.

The air displaced by the deflector as the train advances at speed will obviously and naturally rush in an outward direction from the open car window in front of which the deflector is located, and the formation of a partial vacuum behind the deflector which is due to the suction thus created will cause an out-rush of the air from the car through the open window, thereby thoroughly ventilating the car.

Not only will the entrance of cinders, smoke and the like be effectually prevented by this invention, but thorough and absolute ventilation will be promoted in a most efficient manner. In smoking compartments, the cigar smoke will be carried out instead of being permitted to remain and to taint the upholstery and furnishings of the car, and noxious odors arising from any source, as in dining cars and the like, will likewise be effectually disposed of.

I do not limit myself to the precise construction and arrangement of parts herein shown and described, as the same may be varied in many respects without departing from the nature of my invention; for instance the linked connection shown in Fig. 2 of the drawings may be two in number in order to more securely hold the concaved deflector in a rigid position after the same has been adjusted.

Having thus described the invention what is claimed as new is:

1. A railroad car having window frames, vertically disposed cleats adjacent to said frames, and a concave deflecting shield supported intermediate the window frames and having a flange engaging the rear edge of one of the cleats.

2. A railroad car having window frames, vertically disposed cleats adjacent to said frames, and a concave deflecting shield movably supported intermediate said frames and provided at the edges thereof with flanges adapted for engagement with the cleats.

3. A railroad car having window frames, vertically disposed cleats adjacent to said frames, a concave deflecting shield having link members, the ends of which are hingedly supported intermediate the cleats, said deflector being provided adjacent to its edges with cleat engaging flanges, and shield engaging holding members connected with the cleats.

4. A railroad car having window frames, vertically disposed cleats adjacent to said frames, a concave deflecting shield provided with inturned flanges at its side edges and provided intermediate its side edges with hingedly supported links suitably spaced apart, and plates adjacent to the cleats with which the said links are hingedly connected.

5. A railroad car having window frames, vertically disposed cleats adjacent to said frames, plates mounted upon the car body adjacent to the cleats, a concave deflecting shield having a plate secured upon its inner convex side, links connecting the ends of said plate with the plates secured upon the car body, and holding members consisting of turn buttons connected with the cleats, the shield being provided adjacent to its side edges with inturned flanges, one of which engages the rear edge of one of the cleats where it is held in operative position by the holding member.

In testimony whereof I affix my signature in presence of two witnesses.

THOMAS T. PEDDY.

Witnesses:
J. C. PEDDY,
M. M. HAMNER.